US008561109B2

(12) United States Patent (10) Patent No.: US 8,561,109 B2
Asbun et al. (45) Date of Patent: Oct. 15, 2013

(54) METHOD AND SYSTEM FOR AGGREGATING TV PROGRAM INFORMATION FROM DIFFERENT LIVE TV FEEDS

(75) Inventors: Eduardo Asbun, San Diego, CA (US); Robert H. Wallace, Portsmouth, RI (US)

(73) Assignee: Alcatel Lucent, Paris (FR)

( * ) Notice: Subject to any disclaimer, the term of this patent is extended or adjusted under 35 U.S.C. 154(b) by 531 days.

(21) Appl. No.: 11/683,459

(22) Filed: Mar. 8, 2007

(65) Prior Publication Data

US 2007/0277208 A1 Nov. 29, 2007

Related U.S. Application Data

(60) Provisional application No. 60/744,165, filed on Apr. 3, 2006.

(51) Int. Cl.
*G06F 3/00* (2006.01)
*G06F 13/00* (2006.01)
*H04N 5/445* (2011.01)

(52) U.S. Cl.
USPC .......... 725/48; 725/37; 725/38; 725/39; 725/49

(58) Field of Classification Search
USPC .......................................... 725/46
See application file for complete search history.

(56) References Cited

U.S. PATENT DOCUMENTS

| 7,376,964 | B1 * | 5/2008 | Kim .................................. 725/50 |
| 7,434,245 | B1 * | 10/2008 | Shiga et al. ...................... 725/43 |
| 7,496,946 | B1 * | 2/2009 | Wehmeyer et al. ............. 725/59 |
| 7,525,965 | B1 * | 4/2009 | St. Pierre et al. ............. 370/390 |
| 7,533,271 | B2 * | 5/2009 | Laksono ........................ 713/184 |
| 2002/0129367 | A1 * | 9/2002 | Devara .......................... 725/46 |
| 2002/0133822 | A1 * | 9/2002 | Yang et al. ...................... 725/49 |
| 2003/0023987 | A1 * | 1/2003 | Hiramoto et al. ............. 725/141 |
| 2003/0028896 | A1 * | 2/2003 | Swart et al. ................... 725/127 |
| 2003/0051246 | A1 * | 3/2003 | Wilder et al. .................. 725/49 |
| 2003/0093795 | A1 * | 5/2003 | Takahashi et al. ............. 725/49 |
| 2003/0236843 | A1 | 12/2003 | Weber et al. |
| 2004/0158870 | A1 * | 8/2004 | Paxton et al. ................. 725/115 |
| 2004/0255148 | A1 | 12/2004 | Monteiro et al. |
| 2005/0028206 | A1 * | 2/2005 | Cameron et al. ................ 725/46 |
| 2005/0216945 | A1 * | 9/2005 | Kataoka ........................ 725/116 |

FOREIGN PATENT DOCUMENTS

WO WO0126270 4/2001
WO WO 0143322 6/2001

\* cited by examiner

*Primary Examiner* — Justin Shepard
(74) *Attorney, Agent, or Firm* — Hitt Gaines, PC

(57) ABSTRACT

A method for processing event information from a plurality of different live TV feeds comprises a plurality of operations. An operation is provided for receiving a plurality of different live TV feed data streams. Each one of the live TV feed data streams include program content and event information corresponding to the program content. An operation is provided for extracting the event information from each one of the live TV feed data streams and an operation is provided for aggregating the event information from all of the live TV feed data streams.

19 Claims, 2 Drawing Sheets

METHOD AND SYSTEM FOR AGGREGATING TV PROGRAM INFORMATION FROM DIFFERENT LIVE TV FEEDS

CROSS REFERENCE TO RELATED APPLICATIONS

This patent application claims priority to co-pending U.S. Provisional Patent Application having Ser. No. 60/744,165 filed Apr. 3, 2006 entitled "Streaming of Live TV Feeds", having a common applicant herewith and being incorporated herein in its entirety by reference.

FIELD OF THE DISCLOSURE

The disclosures made herein relate generally to approaches for providing television programming information and, more particularly, to facilitating processing and aggregation of television programming information from different live TV feeds.

BACKGROUND

A "live" TV feed refers to a TV feed source whose content is available only once to a recipient. If the content is not recorded or otherwise saved, the opportunity to watch it is lost. In this scenario, all recipients must watch the content at the same time, at a time set by the entity producing the "live" feed. For example, watching the 6 o'clock news only happens once a day. This is in contrast to "VOD" (video-on-demand) content, where a recipient may request to watch the content at his/her convenience, and may be watched multiple times by different users at different times. For example, ordering a movie from a cable or satellite company is using VOD content. An "off-the-air" TV feed (sometimes also known as "over-the-air") refers to a source whose content is being broadcast, typically over the air, such as broadcast TV. In this case, an antenna may be used to receive the content.

Conventionally, program information for live TV feeds has been provided through a variety of approaches. One conventional program information solution includes a staff of people dedicated exclusively to gathering programming information for a number of live TV feeds and making such information available to service subscribers in the form of an Electronic Program Guide (EPG) via a TV channel (e.g., The TV Guide Channel), in the form of a printed program guide (e.g., a book, a newspaper, etc) via printed media outlets, and/or in the form of an on-line website (e.g., www.tvguide.com). Another conventional program information solution includes program information displayed upon switching to a new TV channel in a cable TV system (e.g., Time-Warner) or satellite TV system (e.g., DirecTV). Still another conventional program information solution includes a dedicated on-screen EPG carried within and accessible from a respective live TV feed. Service providers such as, for example, DirecTV are able to show program information in a standard manner for all content that they offer because they have control over the information contained in the compressed transport stream of the live TV feed.

Various system implementations that allow service subscribers to view TV channels require sourcing such TV channels from a variety of different live TV feeds. Live TV feeds are defined herein to include a TV content signal comprising one or more TV channels and related programming information. Programming information for a channel includes, but is not limited to, channel name, program title, program start time, program duration, program description, available program language(s), and program parental rating.

Streaming live TV feeds to mobile devices is one example of an application in which it is advantageous and/or typical to offer streaming TV content from two or more different live TV feeds. A shortcoming associated with providing service subscribers with TV channels from a variety of different live TV feeds is the lack of an effective and efficient solution for providing such service subscribers with programming information for such TV channels. These different live TV feeds may be provided via satellite, cable and/or over-the-air. Due to the diverse number of possible sources, there is no single resource for service provider-specific programming information available. More specifically, there is no current solution that provides for automated aggregation of program information dependent upon a prescribed group of live TV feeds being offered by a particular service provider. Some of the conventional program information solutions work well when a single service provider (e.g., network) has control over the content being provided via a single live TV feed, but are limited in their effectiveness when TV channels are sourced from a variety of different live TV feeds. One reason for this is that, conceivably, different instances of streaming live TV feeds (e.g., different customer markets, geographic regions, etc) can each have a different set of live TV feed content.

Therefore, a solution that provides for facilitating aggregation of television programming information from different network feed sources in a manner that overcomes drawbacks associated with conventional approaches for facilitating aggregation of television programming information from different network feed sources would be advantageous, desirable and useful.

SUMMARY OF THE DISCLOSURE

Embodiments of the present invention provide for the aggregation of program information from different live TV feeds dependent upon a collection of programming choices offered for being streamed to a client device from such different live TV feeds. Such live TV feeds can be received from different sources such as satellite, cable and over-the-air. Each source of such live TV feed includes its own different resource for making event (i.e., program) information available to service subscribers. Advantageously, embodiments of the present invention provide for aggregation of such event information, thereby providing a singular resource for event information for program content provided by the plurality of different live TV feeds. In accordance with the present invention, event information is gathered from different content providers. This information can be presented to the user, or can be presented as a programming guide from which the user can choose a show to watch. Such an approach for delivering aggregated live TV feed event information for a plurality of different live TV feeds provides a convenient and easy way to enhance value in subscriber offerings. Event information that already exists in TV feeds is made use of. Aggregation of event information in accordance with the present invention allows a client device user to understand and navigate available programming content faster, thereby enhancing the user's experience.

In one embodiment of the present invention, a method for facilitating preparation and delivery of aggregated event information from a plurality of live TV feeds comprises a plurality of operations. An operation is provided for receiving a plurality of different live TV feed data streams. Each one of the live TV feed data streams include program content and event information corresponding to the program content. An operation is provided for extracting the event information from each one of the live TV feed data streams and an operation is provided for aggregating the event information from all of the live TV feed data streams.

In another embodiment of the present invention, an integrated services module comprises an event information repository and an electronic program guide dataset. The event information repository contains event information associated with a respective one of a plurality of different live TV feeds. The electronic program guide dataset contains at least a portion of the event information and represents a displayable electronic program guide image. The portion of the event information contained within the electronic program guide dataset includes event information associated with at least two different ones of the live TV feeds.

In another embodiment of the present invention, a system for facilitating preparation and delivery of aggregated event information from a plurality of live TV feeds comprises data stream processing instructions, event information extraction instructions, and event information aggregation instructions. The data stream processing instructions are configured for processing a plurality of different live TV feed data streams. Each one of the live TV feed data streams includes program content and event information corresponding to the program content. The event information extraction instructions are configured for extracting the event information from each one of the live TV feed data streams. The event information aggregation instructions are configured for aggregating the event information from the live TV feed data streams.

These and other objects, embodiments, advantages and/or distinctions of the present invention will become readily apparent upon further review of the following specification, associated drawings and appended claims.

DETAILED DESCRIPTION OF THE DRAWING FIGURES

Embodiments of the present invention provide event information as value-added to the delivery (e.g., streaming) of live TV feeds. The event information, which is sometimes also referred to as channel or program information, is pre-existent and obtained off the live TV network feeds. This information can be presented stand-alone (i.e., on an as-requested per-channel basis) or as an Electronic Programming Guide showing information for a plurality of channels and/or time periods.

Figure 1:
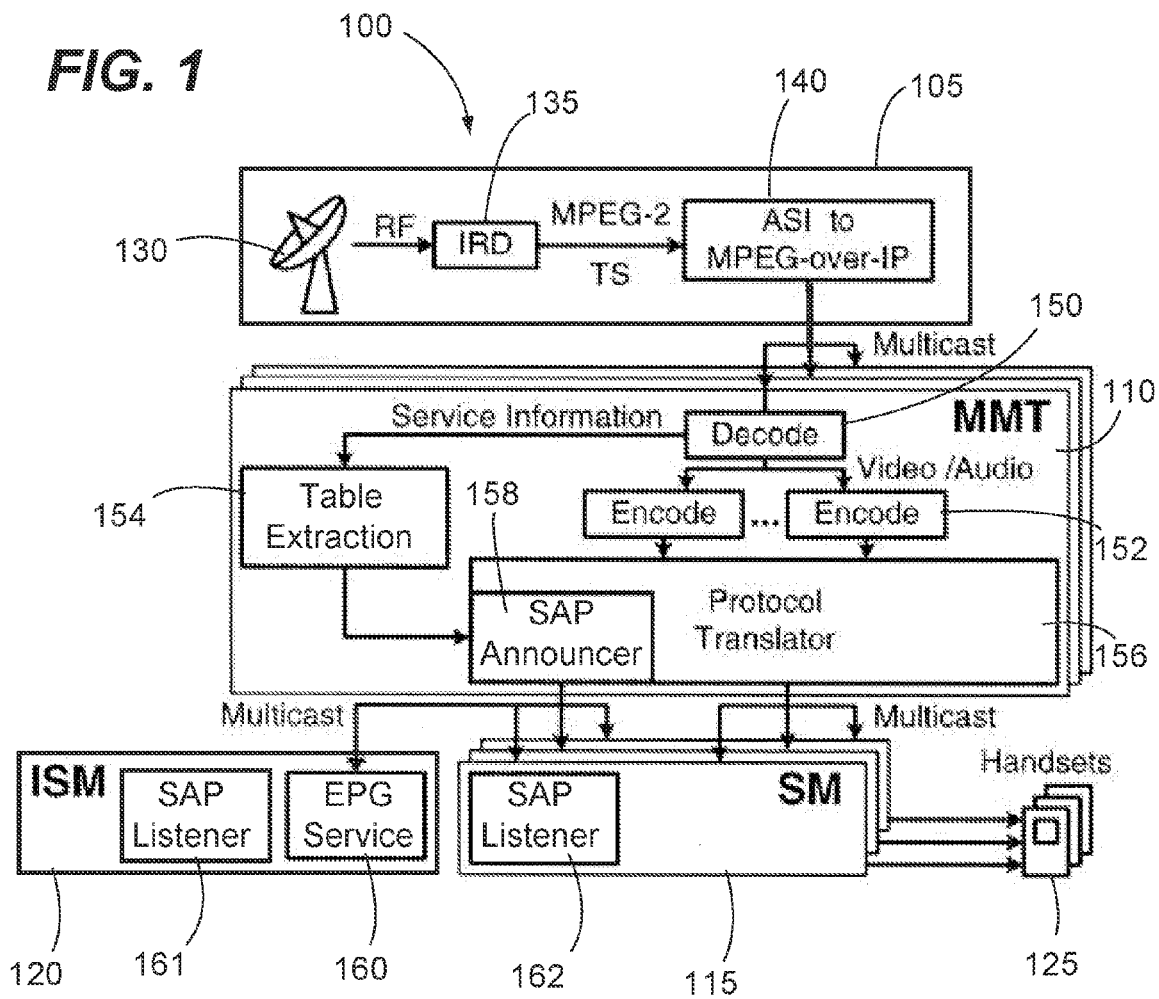
FIG. 1 is a diagrammatic view of an embodiment of a system for facilitating delivery of aggregated event information from a plurality of live TV feeds in accordance with the present invention.

FIG. 1 shows an embodiment of a system 100 for facilitating preparation and delivery of aggregated event information from a plurality of live TV feeds in accordance with the present invention. The system 100 includes a data stream receiving apparatus 105, a plurality of Multimedia Transcoders (MMTs) 110, a plurality of Streaming Modules (SMs) 115, an Integration Services Module (ISM) 120 and a plurality of client devices 125. The MMTs 110 are coupled to the data stream receiving apparatus 105 for allowing data streams from a plurality of live TV feeds to be provided from the data stream receiving apparatus 105 to the MMTs 110 for allowing communication of information therebetween. The SMs 115 are each coupled to at least one of the MMTs 110. It is disclosed herein that the present invention is not unnecessarily limited to any particular number of MMTs 110 or any particular number of SMs 115. For example, there are typically many (e.g., hundreds) of wireless devices connected to a single SM. Furthermore, it is disclosed herein that there is no requirement for a one-to-one correspondence or otherwise specific correlation between the MMTs 110 and the SMs 115. The ISM 120 is coupled to all of the MMTs 110 for allowing communication of information therebetween. The client devices 125 are each coupled to a client device is coupled to one of the SMs 115 in a wired or wireless manner for allowing communication of information therebetween. It is disclosed herein that the present invention is not unnecessarily limited to any particular number of client devices 125 (e.g., wireless mobile devices). For example, in a typical deployment, there can be many (e.g., hundreds) of client devices connected to a single SM. Furthermore, it is disclosed herein that there is no requirement for a one-to-one correspondence or otherwise specific correlation between the client devices 125 and the SMs 115.

The data stream receiving apparatus 105 includes a satellite signal receiver 130, an Integrated Receiver Decoder (IRD) 135, a transport protocol converter 140. The IRD 135 is coupled between the satellite signal receiver 130 and the transport protocol converter 140 thereby allowing for transmission of the live TV feed data streams from the signal receiver 130 to the MPEG converter 140 through the IRD 135. Preferably, but not necessarily, the live TV feed data streams are received by the satellite signal receiver 130 in the form of RF signals. It is disclosed herein that one or more live TV feed data streams can be received via an internal distribution system at a carrier's site and/or other suitable means for acquiring one or more live TV feed data streams. For example, in other embodiment of the present invention, the live TV feeds are provided via compressed or uncompressed video from cable, satellite or off-the-air sources. Accordingly, the present invention is not limited to a particular type of live TV feed source.

The RF data streams are provided to the IRD 135 for allowing the RF signal to be decoded to a MPEG-2 transport format. The MPEG-2 data streams, which are in an Asynchronous Serial Interface (ASI) format, are then provided to the transport protocol converter 140 for converting the data streams from ASI format to Internet Protocol (IP) format for allowing MPEG-2 over IP transmission of the live TV feed data streams to the MMTs 110. ASI is a serial data transmission method that allows packet-based transmission of compressed video such as MPEG-2 transport streams. Converting the data streams from ASI format to IP format includes packetizing the ASI input, which can be performed using a third party system/software such as that commercially available from Path 1 Network Technologies Inc. It is disclosed herein that the data stream receiving apparatus 105 can be simplified if the IRD 135 itself directly supports MPEG-2 over IP MPEG converter 140. In this case, the transport protocol converter 140 can be omitted and the IRD 135 can transmit the data streams directly to the MMTs 110. IRDs that support IP and/or ASI outputs are commercially available from vendors such as, for example, Scopus Video Networks Inc. and Novra Technologies Inc.

It is disclosed herein that the system 100 advantageously utilizes a redundant group of MMTs because MMTs readily allow for control over of table extraction and on the payload of multimedia session announcements, unlike other encoding solutions (e.g., Envivio 4Caster, Real Mobile Media Producer, etc) where such control is limited. Preferably and advantageously, multicasting is used to distribute the live TV feed data streams to the MMTs 110. Multicasting advantageously allows an MMT to choose whether it wants to receive a stream. That is, the multicast traffic is received only if the MMT belongs to the multicast group. The MMT must inform a router/switch of an interconnecting IP network (not specifically shown) that it wishes to join a group by sending it a request. After the router/switch receives the request, the multicast traffic for that group starts being delivered to the MMT. The router/switch periodically queries the MMT for membership to groups. It stops delivering the traffic when the MMT does not reply to its query or if the MMT wishes to leave the group. It is disclosed herein that most mid-range Ethernet Switch products support Internet Group Management Protocol (IGMP) thus eliminating the need for a multicast router. The plurality of MMTs 110 are implemented to provide redundancy and high availability in that one of the MMTs 110 can take over the functions of a failed one of the MMTs 110.

Each MMT 110 includes a decoder 150, a plurality of encoders 152, a table extraction module 154 and a protocol translator 156. The table extraction module 154 is coupled between the decoder 150 and the protocol translator 156. The encoders 152 are coupled in parallel between the decoder 150 and the protocol translator 156.

The live TV feed data streams include audio, video, and system information. System information includes service information (e.g., in the form of tables) used by decoders to identify the appropriate packets that need to be decoded to allow a user to watch a TV program. Upon an MMT 110 receiving the live TV feed data streams (i.e., MPEG-2 transport streams) on its IP interface, the decoder 150 determines the type of information being carried by each packet of each live TV feed data stream. In one embodiment, such determination of information type being carried is based on a Program Identifier (PID). The PID is the "packet identifier" that is carried in the header of all MPEG-2 packets. The PID is 13-bits long and is found in the second octet and third octet (bits 0-4) of the MPEG-2 transport header of each packet.

When the decoder 150 determines that a packet carries service information through assessment of the PID of the packet, such packet is allowed to pass to the table extraction module 154. More specifically, the packet is placed in a buffer by the decoder 150 and is taken off the buffer by the table extraction module 154. Packets identified as having video and/or audio content (i.e., program content) are processed by the decoder 150 and encoder(s) 152 in a conventional manner, which is not discussed in any additional detail herein.

Packets in a live TV feed data stream can carry any one of different types of information. Program Association Tables (PAT) carry information about the different programs available in the feed. A "program" refers to a group of "elementary streams" that comprise what viewers commonly refer to as a "TV channel". Accordingly, a live TV feed can carry several channels of programs. Program Mapping Tables (PMT) carry information about the elementary streams (e.g., a video stream, one or more audio streams (e.g., English, Spanish, etc), one or more data streams (e.g., closed captioning, ancillary information))). Other tables carried by the live TV feed data streams include an Event Information Table (EIT), a Conditional Access Table, a Network Information Table, etc.

With respect to the present invention, the Event Information Table (EIT) is of particular interest and usefulness. Table Extraction as discussed herein refers to the extraction, collection and parsing of Digital Video Broadcasting (DVB) Service Information (SI) from live TV feeds. The EIT is one of the tables in the DVB-SI, which is identified as having PID=0x12. The EIT carries event (i.e., program) information including information on the current running program and on the next program. Providing this information is mandatory for DVB compliance. In addition, there is the option of providing an EIT with information further into the future and for more than one channel. The EIT can be used to provide EIT information such as, but not limited to, program title, program start time, program duration, program description, program language and program parental rating, etc. It can also include information relating to a classification of the program thus allowing programs to be classified into categories such as movie, news, game show, etc.

TSReader is a transport stream analyzer for MPEG-2 systems, which is commercially available freeware. TSReader supports DVB to the MPEG-2 specification. Table 1 below shows sample EIT information output. As can be appreciated from this sample output, a great deal of information is readily available. The Extraction table module 154 can perform a small amount of processing to choose the appropriate information from within the EIT and to format such chosen information before forwarding it for delivery or further manipulation. For example, some information can be overlaid on a handset screen or can be gathered from several programs to prepare an EPG.

TABLE 1

Sample EIT output using TSReader.

| | |
|---|---|
| Starts: | 15/04/2005 22:50:00 |
| Length: | 01:00:00 |
| Name: | Central nuit |
| Short Description: | <<Les jeux du cirque>>. Série policière. 2003. Saison 2. Episode 8. |
| Source: | DVB Short Event |
| Component: | Stereo fre (audio, stereo (2 channel)) |
| Parental rating: | Country fra Rating 12 years old |
| Content: | Detective/thriller (user 0x0/0x0) |

A conventionally configured MMT is capable of extracting some of the service information from a live TV feed data stream, such as PAT information and PMT information, to obtain the PID of the programs in the a live TV feed data stream. In accordance with the present invention, the MMT code of the MMTs 110 can be extended to extract the EIT information (and other table information), as needed.

Once a packet carrying EIT information is identified, the table extraction module 154 extracts the payload of the packet comprising EIT information. The EIT information is then parsed (i.e., examined) to determine if it contains new information, which is information that has not yet been received by the table extraction module 154. Typically, this parsing is done based on the "version" of the table. The information version is the same when the information in the EIT of a current instance is the same as that in a previous EIT instance, and it is changed when the information EIT of a current instance changes with respect to a previous instance of the EIT. If the version is new, then the payload is saved for further processing. Otherwise, it is discarded.

DVB-SI is transmitted as tables within the MPEG-2 TS multiplex. Accordingly, an EIT can be too long to be carried by only one MPEG-2 packet, resulting in an EIT often being partitioned in several sections to limit overhead. As such, when the EIT is fragmented into several pieces, each piece is carried in a separate MPEG-2 packet. Therefore, the table extraction module 154 further processes the payload to put together all the pieces of the corresponding EIT. It uses a "sequence number" to identify the different pieces of a segmented EIT.

Furthermore, due to its size, an EIT is generally not transmitted continuously but periodically. Therefore, an EIT may not be instantly available and, because an EIT is often transmitted in sections, it needs to be extracted, collected and parsed before it can be used. To address the need of having immediate access to the tables, the table extraction module 154 and/or other component of the system 100 (e.g., the ISM 120) can maintain a cache of the most recent EIT information and make such information available on request.

Although there are other solutions for extracting event information from an MPEG-2 data stream, these other solutions typically require complex external subsystems that monitor the MPEG-2 data streams. These other systems have proven in the past to be very difficult to integrate with and are typically quite costly. They also have to duplicate functionality that already exists in an MMT for decoding the MPEG-2 data stream. An MMT-based approach to extraction as disclosed herein is advantageous in that in many carrier systems, it adds little to no capital expenditure costs and provides the required event information in a manner that can easily be integrated into a system deployment.

Once all the pieces of an EIT have been extracted, the table extraction module 154 passes the EIT to an SAP (i.e., Session Announcement Protocol) Announcer 158 of the protocol translator 156, which sends the EIT to an SAP listener 161 of the ISM 120. Conventional packet video systems establish unicast sessions between the MMTs 110 and subtending modules such as the SMs 115 and ISM 120. However, such a unicast transmission scheme does not scale well when the number of MMTs, SMs and client devices grows significantly. Accordingly, the system 100 multicasts information (e.g., the EIT) from the MMTs 110 to the SAP listener 161 of the ISM 120 and SAP lister 162 of the SMs 115 to enhance performance and reliability.

The EPG service module 160 receives the EIT for a plurality of live TV feeds via the SAP listener 161 of the ISM 120 and prepares an EPG for all the live TV feeds. The EPG service module 160 processes the EITs to extract information of interest (e.g., the description of shows, start time, duration, ratings, etc) and aggregates this information in a pre-defined or user specified format. All or a portion of this aggregated information is the event information provided to the client devices 125.

It is disclosed herein that the event information can be provided to the client devices 125 in a standalone mode or on-demand. In the stand-alone mode, the ISM 120 provides event information about specific content within a particular live TV feed data stream being sent to one or more of the client devices 125. For example, when the client device 125 "tunes" into a live TV feed data stream (i.e., a "channel"), event information about the program (i.e., the "show") of the channel such as title, running time, rating, etc, is provided to the client device 125. The specific format in which the event information is presented to a client device 125 may be pre-defined or client specified. Examples of such formats include, but are not limited to, being overlaid on top of other content, being at the bottom of the visual display of the client device, crawling text across the visual display, etc). In on-demand mode, the ISM 120 provides event information about all of the content in the live TV feed data streams available to the client devices. Examples of such event information include, but are not limited to, information relating to current programs, information relating to programs that will be available in the future and information relating to programs that were available in the past. This mode is similar to a program menu of a satellite or cable subscriber system. Examples of formats in which the EPG may be viewed include, but are not limited to, scroll thru listings, full screen display, picture-in-picture display, etc. Examples of an EPG format include, but are not limited to, a format such as that known in a single network satellite TV program system (e.g., DirecTV brand satellite TV program service), a single network cable TV program system (e.g., Time-Warner brand cable TV program service), and the like.

It is disclosed herein that aggregation of event information in accordance with the present invention is the same for standalone mode and EPG mode. Regardless of the specific mode of presentation, the EPG service module 160 of the ISM 120 performs such aggregation. The EPG service module 160 collects the event information received from the table extraction module 154 and creates a database that contains detailed event information. On an as-needed basis, the event information in the database is updated as it is received from the table extraction module 154. For example, event information in the database can be saved using a rolling window of time (e.g., the size of the window, for example a few hours or a couple of days, is configurable by the operator), thus discarding outdated event information as new event information becomes available.

The specific approach for providing the event information to the client devices 125 depends on the specific mode of delivery for such event information. With respect to the on-demand mode of delivery, in one embodiment, the client devices 125 (or an external/web application on the client device) can make an API call to the respective SM 115 requesting EPG information. In response, an Application Programming Interface (API) in the respective SM 115 uses Simple Object Access Protocol (SOAP) based messages to communicate with the other modules such as, for example, the ISM 120 and with client devices 125. The client devices 125 can request EPG information for a range of time and channels using a SOAP API. With respect to the stand-alone mode of delivery (i.e., an additional program in a channel lineup), in one embodiment, a user uses the client device to tune into a pre-determined channel where EPG information is sent. This is a data channel, not an audio/video channel.

Turning now to a discussion of the announcement mechanism between the MMTs 110, the SMs 115 and the ISM 120, the SAP Announcer 158 multicasts (i.e., sends) Session Description Protocol (SDP) information and the EIT to the SAP listener 161 of the ISM 120 and the SAP listener 162 of each SM 115. The SAP listener 161 of the ISM 120 listens for SDP information and EIT information, whereas the SAP listener 162 of the SMs 115 listens for only SDP information. As disclosed above, the EPG service module 160 uses EIT information (e.g., information in the EIT) to create an EPG that is available to the user.

Accordingly, a SAP announcement as disclosed herein with respect to the SAP announcer 158 includes SDP information and EIT information. A multicast group consisting of the SMs 115 and the ISM 120 will receive SAP announcements from the MMTs 110. The SDP information (i.e., type='application/sdp') includes the description of the available multicast sessions that all or a portion of the SMs 115 can receive. The SMs 115 use the SDP information to learn about the sessions available, and to receive and process some of them for delivery to the client devices 125. The EPG service module 160 does not use the SDP information.

In one embodiment, SAP announcers and SAP listeners in accordance with the present invention are configured in accordance with Session Announcement Protocol (SAP) version 2, described in RFC 2974. However, the present invention is not unnecessarily limited to a particular mechanism for communication information between various system components required for facilitating aggregation of EIT information. SAP version 2 as described in RFC 2974 is an experimental protocol used to advertise multicast multimedia sessions. The announcement contains all relevant session setup information to prospective participants. An SAP announcer in accordance with SAP version 2 periodically multicasts announcement packets to a well-known multicast IP address and UDP port. A SAP listener in accordance with SAP version 2 listens on a well-known SAP address and port for those announcements, eventually learning of all the sessions being announced, allowing those sessions to be joined. The SAP announcer is not aware of the presence or absence of any SAP listeners, and SAP does not provide additional reliability over the standard best-effort UDP/IP semantics.

Figure 2:
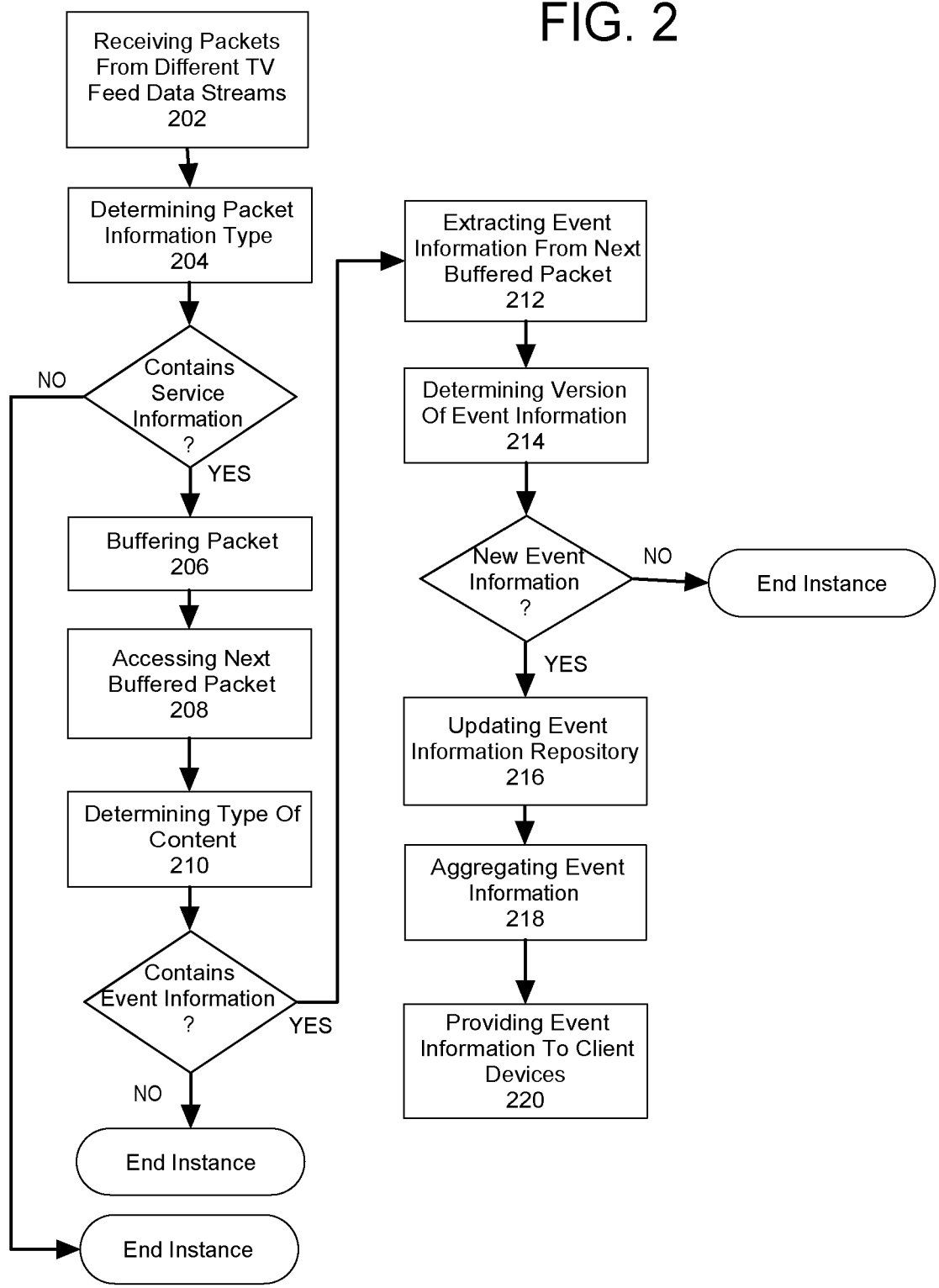
FIG. 2 is a flow diagram of an embodiment of a method for facilitating preparation and delivery of aggregated event information from a plurality of live TV feeds in accordance with the present invention.

A skilled person will appreciate and it is disclosed herein that facilitating aggregation of event information in accordance with the present invention is not unnecessarily limited to one particular system, to one particular arrangement of system component or to any particular system component. Accordingly, FIG. 2 shows an embodiment of a method 200 for facilitating preparation and delivery of aggregated event information from a plurality of live TV feeds in accordance with the present invention and that is not limited in its implementation to a particular system, arrangement of system component or system component. As such, it is disclosed herein that methods in accordance with the present invention such as, for example, the method 200 are capable of being carried out by any number of different systems component configurations.

Still referring to FIG. 2, the method 200 begins with an operation 202 for receiving a plurality of different live TV feed data streams. Two or more of the live TV feed data streams are from different sources (e.g., networks, content distributors, etc). Each one of the live TV feed data streams comprises a plurality of packets and each packet includes program content, event information corresponding to the program content or both. It is disclosed herein that the packets are one example of data transmission unit that may carry content within the live TV feed data streams and that the present invention is not limited to a particular type of data transmission unit.

In conjunction with receiving the plurality of different live TV feed data streams, an operation 204 is performed for determining an information type of each packet in each one of the live TV feed data streams. In response to determining that a particular packet carries service information, an operation 206 is performed for buffering the packet for allowing it to be accessed at a late point in time. Buffering is defined herein to include storing or otherwise retaining the packet for allowing it to be subsequently accessed, whereby other means of storage besides a buffer may be implemented. In response to determining that the particular packet does not carry service information, the packet is discarded and the current instance of processing the particular packet ends. The operations for determining the information type of each packet in each one of the live TV feed data streams and for a packet being buffered containing service information being buffered is repeatedly (e.g., sequentially) performed for all packets of the live TV feed data streams. Thus, a queue of packets is buffered (i.e., retained) for being accessed at a later point in time.

An operation 208 is performed for accessing the next packet in the buffer, followed by an operation 210 for determining a type of content within that packet (i.e., the next packet accessed). In response to determining that a particular packet carries event information (e.g., an EIT), an operation 212 is performed for extracting that event information from the packet. In response to determining that the packet does not carry event information, the packet is discarded and the current instance of processing the packet ends. In the case where the packet is determined to carry event information, an operation 214 is performed for determining a version of the event information. Such determination can be made by comparing information that designates a version of the event information in the packet to that of already extracted event information. In one embodiment, a version identifier of previously extracted event information is stored in an event information repository along with the associated event information and the version of the event information in the current extraction instance is compared thereto. When the versions of the currently extracted and stored event information event are the same, the event information of the current extraction instance is discarded and the current determination instance ends. When the versions of the currently extracted and stored event information event are different, an operation 216 is performed for updating the event information repository with the event information of the current extraction instance and the associated version information, thereby replacing the corresponding stored event information and associated version information. Embodiments of maintaining the event information repository include replacing stored event information with corresponding newly extracted event information, replacing stored version information with corresponding newly extracted version information, and populating the event information repository with entirely new event information (i.e., as opposed to updating information).

In some instances of event information, the event information can be too long to be carried by only one packet, resulting in the event information being partitioned in several sections to limit overhead. As such, when the event information is fragmented into several pieces, each piece is carried in a separate packet. In such instances, an operation is performed for combining the fragment pieces of the event information to form unitised event information (i.e., the event information). It is disclosed herein that the operation for combining the fragment pieces of the event information may be performed prior to or after the operation 214 for determining the version of the event information.

Either upon demand by a subscriber or at predetermined time periods, an operation 218 is performed for aggregating all or a portion of the event information in the event information repository. In at least one embodiment of the present invention, aggregating the event information includes preparing (i.e., creating) a dataset representing an image of an EPG (i.e., an EPG dataset). After performing the operation for aggregating the event information, an operation 220 is performed for providing all or a portion of the aggregated event information to one or more client devices. In at least one embodiment of the present invention, preparing the electronic program guide includes selecting event information dependent upon program content accessible in a current multicast session to which at least one of the client devices is a member. A wireless mobile device such as a cellular phone or personal digital assistant are examples of a client device, and multicasting, unicasting and broadcasting are examples of means for providing the aggregated event information to a client device. Optionally, in addition to or in place of providing all or a portion of the aggregated event information to one or more client devices, an operation can be performed for providing all or a portion of the aggregated event information to one or more applications that each provide for one or more media delivery services. A service provider or other suitable/appropriate party may offer such media delivery services.

Referring now to instructions processible by a data processing device, it will be understood from the disclosures made herein that methods, processes and/or operations adapted for carrying out event information processing and/or aggregation functionality as disclosed herein are tangibly embodied by computer readable medium having instructions thereon that are configured for carrying out such functionality. In one specific embodiment, the instructions are tangibly embodied for carrying out the method 200 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the presenting invention include a compact disk, a hard drive, RAM or other type of storage apparatus that has imaged thereon a computer program (i.e., instructions) adapted for carrying out event information processing and/or aggregation functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating preparation and delivery of aggregated event information from a plurality of live TV feeds, comprising:
   receiving a plurality of different live TV feed data streams, which are provided from at least two of satellite, cable and over-the air, wherein each one of said live TV feed data streams includes program content and event information corresponding to said program content;
   permitting extraction of an event table that carries the event information from the live TV feed data streams;
   extracting said event information contained in the event information table from each one of said live TV feed data streams;
   receiving the event information table that carries the event information from the live TV feed data streams via a multicast transmission; and
   aggregating automatically all of said event information from all of said live TV feed data streams at a carrier's site in a predefined format.

2. The method of claim 1, further comprising:
   at least one of providing at least a portion of said aggregated event information to a plurality of client devices and providing at least a portion of said aggregated event information to an application that provides for a media delivery service and wherein the event information table includes event information related to an event title, an event start time, an event duration, an event description, an event language an event parental rating and an event category.

3. The method of claim 2 wherein:
   said aggregating event information includes maintaining an event information repository containing said event information and preparing an electronic program guide including at least a portion of said event information; and
   said providing at least a portion of said aggregated event information includes one of providing the electronic program guide and providing event information corresponding to a designated portion of said program content.

4. The method of claim 3 wherein preparing the electronic program guide includes selecting event information dependent upon program content accessible in a current multicast session.

5. The method of claim 1 wherein said aggregating event information includes:
   maintaining an event information repository containing said event information;
   determining a version of said extracted event information and a version of corresponding event information maintained within the event information repository; and
   replacing said corresponding event information with said extracted information in response to determining that said extracted information is of a newer version than said corresponding event information.

6. The method of claim 5, further comprising:
   determining a type of information contained within each data transmission unit of each one of said live TV feed data streams; and
   buffering data transmission units determined to contain service information;
   wherein said extracting event information includes accessing one of said buffered data transmission units, determining contents of said one data transmission unit in response to accessing said one data transmission unit, and extracting event information from said one data transmission unit in response to determining that said one data transmission unit contains event information.

7. The method of claim 1 wherein said extracting event information includes:
   accessing a data transmission unit of one of said live TV feed data streams;
   determining contents of said one data transmission unit in response to accessing said one data transmission unit, and
   extracting event information from said one data transmission unit in response to determining that said one data transmission unit contains event information and
   wherein a data stream receiving apparatus located at the carrier's site receives the plurality of different live TV feed data streams and a plurality of multimedia transcoders are coupled to the data stream receiving apparatus to permit extraction of the event information table that carries event information from the live TV feed data streams and an integration services module receives the event information table from the plurality of multimedia transcoders and is used to aggregate the event information in a predefined format at the carrier's site; and a plurality of streaming modules are connected to the integration services module wherein the aggregated event information is provided to a plurality of client devices from one of the integration services module and the plurality of streaming modules.

8. An integrated services module, comprising:
a memory containing a set of instructions and a processor for processing the set of instructions;
an event information repository containing event information associated with a respective one of a plurality of different live TV feeds which are provided from at least two of satellite, cable and over-the-air, wherein the set of instructions permit receipt of event information contained in an event information table via a multicast transmission and storage of event information in the event information repository, and wherein each one of said live TV feeds includes program content and event information corresponding to said program content; and
an electronic program guide dataset containing at least a portion of said event information and representing a displayable electronic program guide image, wherein the portion of said event information contained within the electronic program guide dataset includes event information associated with at least two different ones of said live TV feeds, wherein at least a portion of all event information available from the at least two different live TV feeds is contained in the electronic program guide and was aggregated automatically at a carrier's site;
wherein the integrated services module is configured to provide the aggregated event information to a plurality of client devices in a stand-alone or an on-demand mode, wherein said stand-alone mode, the integrated services module providing event information about specific content within a particular live TV feed data stream being sent to one or more of the client devices and wherein said on-demand mode, the integrated services module providing event information about the content in the live TV feed data streams available to the client devices.

9. The integrated services module of claim 8 wherein the event information repository includes at least one of event information for past program content, event information for current program content, and event information for future program content.

10. The integrated services module of claim 8 wherein said event information contained in the electronic program guide dataset is dependent upon program content capable of being multicast to a designated plurality of client devices.

11. The integrated services module of claim 10 wherein the event information repository includes at least one of event information for past program content, event information for current program content, and event information for future program content.

12. The integrated services module of claim 8 wherein:
the event information repository includes event information for past program content, event information for current program content, and event information for future program content;
the electronic program guide dataset includes event information for past program content, event information for current program content, and event information for future program content; and
said event information contained in the electronic program guide dataset is dependent upon program content capable of being multicast to a designated plurality of client devices.

13. A system for facilitating preparation and delivery of aggregated event information from a plurality of live TV feeds, comprising:
a memory containing a set of instructions wherein the instructions include:
data stream processing instructions configured for processing a plurality of different live TV feed data streams, wherein each one of said live TV feed data streams includes program content and event information contained in an event information table corresponding to said program content;
event information extraction instructions configured for extracting said event information from each one of said live TV feed data streams and including:
instructions for accessing a data transmission unit of one of said live TV feed data streams,
instructions for determining contents of said one data transmission unit in response to said one data transmission unit being accessed, and
instructions for extracting event information from said one data transmission unit in response to said one data transmission unit being determined to contain event information; and
event information aggregation instructions configured for aggregating automatically said event information from all of said live TV feed data streams at a carrier's site;
an integrated services module (ISM) including a processor for processing the set of instructions;
a data stream receiving apparatus located at the carrier's site configured to receive the plurality of different live TV feed data streams;
a plurality of multimedia transcoders coupled to the data stream receiving apparatus to permit extraction of the event information table that carries event information from the live TV feed data streams, wherein the ISM is configured to receive the event information table from the plurality of multimedia transcoders and aggregate the event information in a predefined format at the carrier's site; and
a plurality of streaming modules connected to the ISM, wherein the ISM and the plurality of streaming modules are configured to provide the aggregated event information to a plurality of client devices based on a mode of delivery for the aggregated event information.

14. The system of claim 13 wherein:
said event information aggregation instructions includes instructions for maintaining an event information repository containing said event information and instructions for preparing an electronic program guide including at least a portion of said event information.

15. The system of claim 13, further comprising:
transmitting instructions configured for providing a designated portion of said aggregated event information to at least one of a plurality of client devices and an application that provides for a media delivery service.

16. The system of claim 15 wherein said transmitting instructions arrangement for providing at least a portion of said aggregated event information includes:
instructions for one of providing the electronic program guide; and
instructions for providing event information corresponding to a designated portion of said program content.

17. The system of claim 16 wherein said instructions for preparing the electronic program guide includes instructions for selecting event information dependent upon program content accessible in a current multicast session.

18. The system of claim 13 wherein said event information aggregation instructions includes:
instructions for maintaining an event information repository containing said event information;

instructions for determining a version of said extracted event information and a version of corresponding event information maintained within the event information repository; and instructions for replacing said corresponding event information with said extracted information in response to determining that said extracted information is of a newer version than said corresponding event information.

19. The system of claim 18 wherein said data stream processing instructions includes:

instructions for determining a type of information contained within each data transmission unit of each one of said live TV feed data streams; and instructions for buffering data transmission units determined to contain service information.

\* \* \* \* \*